Feb. 9, 1943.    V. B. GAY    2,310,776
TIRE
Filed April 12, 1941
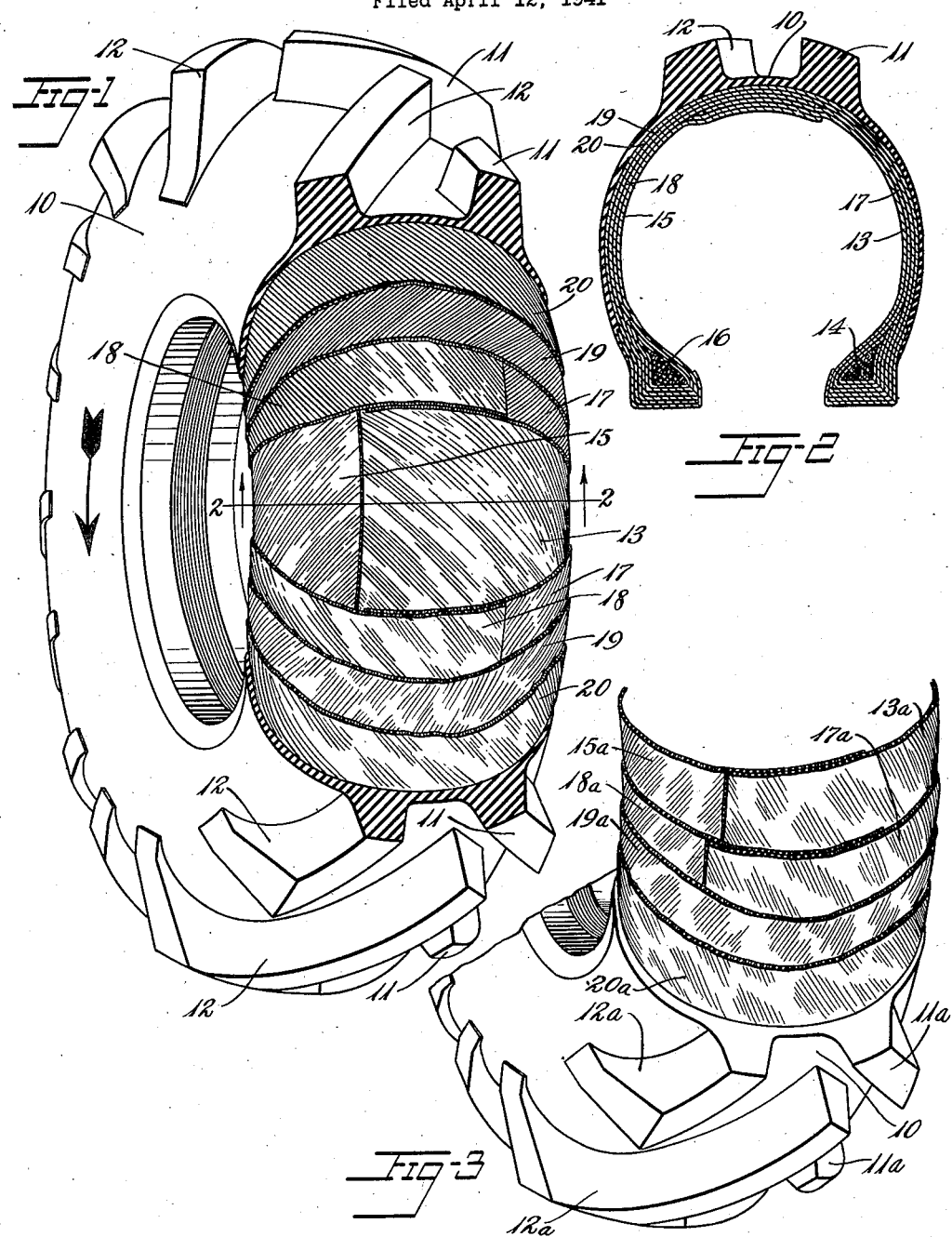
Inventor
Vincent B. Gay
By
Atty.

Patented Feb. 9, 1943

2,310,776

UNITED STATES PATENT OFFICE 2,310,776

TIRE

Vincent B. Gay, Clinton, Ohio, assignor to The B. F. Goodrich Company, New York, N. Y., a corporation of New York Application April 12, 1941, Serial No. 388,288

9 Claims. (Cl. 152—356)

This invention relates to pneumatic tires for vehicles, and especially vehicles such as tractors and the like heavy-duty farming and construction equipment. The invention is useful especially in tractor tires having a tread pattern of raised cleats or bars for effective traction under varying conditions of load and ground surface.

Heretofore, in attempts to provide a satisfactory tire for such use the difficulty has sometimes been encountered of premature tire failure as a result of loosening and separation of the innermost reinforcing bead-to-bead ply of the casing from the next to the innermost ply when the tire has been subjected to severe operating conditions. Also, in some cases, early tire failure has resulted from actual breakdown of the cords of the innermost bead-to-bead ply.

I have found that in a tractor tire having a tread pattern of oblique bars disposed in a series of bars usually obliquely disposed or in a chevron design, and reinforcing plies in the casing, the cords of which extend obliquely about the tire casing continuously from bead-to-bead, the separation of the cords of the innermost ply from the next to the innermost ply, or breakdown of the cords of the innermost ply, occurs in most cases in the shoulder region or sidewall of the tire in the side of the casing where the cords of the innermost ply are in crossed-relation with respect to the oblique bars on that side of the tread region.

Apparently, this separation and breakdown has resulted, at least in part, from the fact that the cords of the innermost ply of a tractor tire casing, on the side wherein the oblique bars of the tread have been crossed with respect thereto, have been principally subjected to tensile stresses, while in the other side where the innermost cords and the tread bars extend in the same direction the stresses in the cord have been largely compression.

In a tire of the type where oblique tread bars have been disposed in crossed-relation to the cords of the innermost bead-to-bead ply in corresponding portions of the casing, such cords, when subjected to tensile forces transmitted thereto from the ground traction forces through the tread bars, and being unsupported in the inward direction have tended to pull-away and separate from the next to the innermost ply adjacent thereto. Furthermore, with the objectionable crossed-disposition of tread bars and innermost ply cords in one side of a tire in prior constructions, the resultant undesirable tension has sometimes been so excessive as to cause actual breakdown of the cords of the unsupported innermost ply, especially under conditions of heavy-load and extreme draw-bar pull.

It has been found beneficial to extend the traction elements of a tire tread generally in converging relation centrally of the tire and in the direction of rotation of the tire in use so that the apices or portions of the elements nearest convergence will engage the ground first to provide for a self-cleaning action of the elements and effective traction.

The chief objects of the present invention are to overcome the difficulties encountered in prior constructions wherein the cords of the innermost reinforcing ply have been subjected to forces tending to cause separation or breakdown; to provide for reduction or elimination of such objectionable forces; to provide for improved distribution of stresses throughout the tire and especially at the innermost plies of a tractor tire; to provide for increased tire life under operating conditions; to provide for improved tire casing construction while eliminating the necessity of the insertion of additional breaker plies in the tread region of the casing, and to provide for economy and convenience of construction.

These and further objects will be apparent from the following description, reference being had to the accompanying drawing in which:

Fig. 1 is a perspective view of a tractor tire constructed in accordance with and embodying the invention, parts being broken away and sectioned.

Fig. 2 is a section taken along the line 2—2 of Fig. 1.

Fig. 3 is a perspective view of a portion of a tractor tire showing a modified construction, parts being broken away and sectioned.

A tire constructed in accordance with my invention and illustrative of the principles thereof, though not wholly limiting as to specific construction, is shown in Figs. 1 and 2 of the drawing. The illustrated tire includes a tread portion 10 of rubber or other rubber-like material incorporating a series of raised cleats or bars 11, 11 extending from the shoulder region on one side of the tire diagonally across a portion of the crown in the direction of rotation of the tire in service, as indicated by the directional arrow in Fig. 1, and a series of bars 12, 12 extending from the opposite shoulder region diagonally across a portion of the crown in the direction of rotation and in crossed-relation with respect to the bars 11, 11. The tread bars as here shown are staggered, but if desired the tread pattern may comprise a series of chevrons, or a derivative of a chevron design, or any other suitable disposition of bars, to provide traction desirable in a tire adapted to be used on tractors or other heavy-duty traction vehicles or equipment.

To the end of attaining the objects of my invention, as hereinabove set forth, a ply 13, preferably of weftless or weak-wefted cords, is anchored about one bead portion 14 of the casing and is disposed in a manner to extend only partly across the tire, terminating short of the other bead portion, the margin of the ply 13 preferably terminating in the tread region or crown beyond the center line thereof, as indicated in the drawing. The cord ply 13 is cut on the bias and is disposed so that the cords of the ply extend obliquely about the tire casing and in the direction of the oblique tread bars 11, 11 on the corresponding side of the tread portion 10.

A second cord ply 15 is anchored about bead portion 16 and is disposed to extend about the corresponding sidewall and shoulder region and a portion of the crown to a point of marginal termination on the other side of the center line of the crown. The ply 15 is also cut on the bias, but this second ply, anchored to the opposite bead core from that to which the ply 13 is anchored, is disposed in a manner such that the cords extend obliquely about the casing in a direction opposite to the direction in which the cords of the ply 13 extend and in the direction of the oblique tread bars 12, 12 on the side of the tire in which the cord ply 15 is anchored and about the sidewall, shoulder and crown of which said ply extends.

The pair of plies 13 and 15 are of less than bead-to-bead width, and preferably overlap centrally of the tire in a manner providing, as to this pair, double thickness in the crown and single thickness in the sidewalls such that greater yieldability of the cords and improved ability of the plies to withstand and absorb the shocks of impact and extreme stresses is provided for. This is in contrast to prior constructions comprising an innermost reinforcing ply firmly and substantially unyieldingly anchored about both bead cores of the tire which ply has sometimes been subject to early failure due to the susceptibility of the cords of such ply to rupture and pulling-away in the unsupported inward direction from the adjacent ply outwardly thereof.

A traction tire constructed according to my invention, with the innermost cord reinforcements disposed as hereinabove described, has been found to afford remarkably improved results as regards length of tire life and durability of structure under severe conditions of service. These improved results apparently are due, at least in part, to the fact that objectionable localized tension is avoided in the cords.

The new results are contributed to by providing for the avoidance of a crossed relationship between tread bars and the corresponding unsupported cords, and are further contributed to by avoiding the restrictive double anchorage of unsupported continuous bead-to-bead cords of prior constructions.

Outwardly of the overlapping innermost plies 13 and 15, a second pair of centrally overlapping plies 17 and 18 of less than bead-to-bead width may be disposed in a manner such that the cords of the same are in crossed-relation to the cords of the innermost plies 13 and 15, as indicated in Fig. 1 of the drawing.

Alternatively, a pair of plies 17a and 18a, adjacent to and outwardly of the innermost plies 13a and 15a, may be disposed with the cords of the same extending in the direction of the cords of the innermost plies 13a and 15a and in the direction of the corresponding tread bars 11a, 11a, and the bars 12a, 12a, respectively, as indicated in Fig. 3, and good results obtained thereby. If desired, a continuously extending bead-to-bead ply, in lieu of a second pair of overlapping plies, may be disposed adjacent to and outwardly of the innermost overlapping plies 13a and 15a.

Additional bead-to-bead plies may be provided in the casing as necessary or desirable to afford adequate tire casing reinforcement. By way of example, two additional bead-to-bead plies 19 and 20 in Figs. 1 and 2 and 19a and 20a in Fig. 3 are shown in the drawing with the cords of adjacent plies in crossed-relation. However, any desired number of additional bead-to-bead plies may be provided, and disposed with the cords as between plies in parallel-relation or in crossed-relation, or with the cords as between some of the plies in parallel-relation and the cords as between other plies in crossed-relation.

The improved construction of the invention has the advantage also of eliminating the necessity of resort to the expedient of inserting extra breaker plies in a tire casing to provide for resistance to the shocks of impact in the tread portion or shoulder regions of a tire. The increased yieldability provided in the innermost plies of a tire casing by the application of my invention, together with the added thickness of reinforcement provided for in the crown region of a tire by the overlap of some of the plies provides for shock resistance.

However, the applicability of my invention is not limited entirely to tire casing constructions in which extra breaker plies are not inserted, nor entirely to the illustrative tire constructions shown and described herein.

Variations may be made without departing from the scope of the invention as it is defined by the following claims.

I claim:

1. A tire comprising a body of resilient rubber-like material, including a tread having a plurality of spaced-apart, raised traction elements extending diagonally across the tread in converging relation in the same circumferential direction about the tire, said body having a pair of bead portions and a plurality of superimposed reinforcing cord plies in said rubber-like material and anchored in said bead portions, the innermost pair of said plies being of less than bead-to-bead width and overlapping centrally of the tire with each of such innermost plies anchored in a bead portion, the cords of each ply of said innermost pair being all in substantially parallel relation in the ply and the cords of the two plies extending in converging relation generally in the direction of convergence of the traction elements, and reinforcing plies outwardly of said innermost pair being each of bead-to-bead extent and anchored in both bead portions.

2. A tire comprising a body of resilient rubber-like material, including a tread having a plurality of spaced-apart, raised traction elements extending diagonally across the tread in converging relation in the same circumferential direction about the tire, said body having a pair of bead portions and comprising reinforcing tension elements in said rubber-like material, said tension elements being disposed in a pair of plies each of less than bead-to-bead width and each being anchored in a bead portion, and the tension elements of each ply of the pair being all in substantially parallel relation in the ply and the tension elements of the two plies extending in converging relation generally in the direction of convergence of said traction elements.

3. A tire comprising a body of resilient rubber-like material, including a tread having a plurality of spaced-apart, raised traction elements extending diagonally across the tread in converging relation in the same circumferential direction about the tire, said body having a pair of bead portions and comprising a plurality of plies of reinforcing tension elements in said rubber-like material, a pair of adjacent plies of said tension elements being of less than bead-to-bead width and each being anchored in a bead portion and extending across the tread region of the tire in overlapping relation, and the tension elements of each ply of the pair being all in substantially parallel relation in the ply and the tension elements of the two plies extending in converging relation generally in the direction of convergence of the traction elements.

4. A tire comprising a body of resilient rubber-like material, including a tread having a plurality of spaced-apart, raised traction elements extending diagonally across the tread in converging relation in the same circumferential direction about the tire, said body having a pair of bead portions and comprising a plurality of plies of reinforcing tension elements in said rubber-like material, the innermost ply of said body and the ply next outwardly adjacent thereto each being of less than bead-to-bead width and anchored in a bead portion and extending in overlapping relation across the tread region of the tire, and the tension elements of such innermost plies being all in substantially parallel relation in the ply and the tension elements of the two plies extending in converging relation generally in the direction of convergence of the traction elements.

5. A pneumatic tire having a flexible body of rubber-like material engageable with a rim and including a pair of sidewalls and a ground-engaging tread, said body comprising a layer of cords in a sidewall at the inner face of the tire having the cords thereof extending diagonally from a rim-engaging portion to a portion at the tread of the tire, and a second layer of cords in the other sidewall at the inner face of the tire having the cords thereof extending in a diagonal direction to converge with the cords of the first said layer from a rim-engaging portion to a position at the tread of the tire, whereby torsional forces transmitted between the tread and the rim through said body exert less tension on the cords of both said layers at said inner face when the tire is driven in said direction of convergence of the cords than when it is driven in the opposite direction.

6. A pneumatic tire having a flexible body of rubber-like material and including a pair of sidewalls, pair of spaced-apart bead portions and a ground-engaging tread, said body comprising a layer of cords at its inner face at one side of the tire and having the cords thereof anchored in one bead portion of the tire and extending diagonally to a position at the tread of the tire, and a second layer of cords at said inner face at the other side of the tire and having the cords thereof anchored in the other bead portion of the tire and extending in a diagonal direction converging with the cords of said first layer to a position at the tread of the tire, whereby torsional forces transmitted through said body exert less tension on the cords of both said layers at said inner face when the tire is driven in said direction of convergence than when it is driven in the opposite direction.

7. A pneumatic tire having a flexible body of rubber-like material and including a pair of sidewalls, pair of spaced-apart bead portions and a ground-engaging tread, said body comprising a layer of cords at its inner face at one side of the tire and having the cords thereof anchored in one bead portion of the tire and extending diagonally to a position at the tread of the tire, and a second layer of cords at said inner face at the other side of the tire and having the cords thereof anchored in the other bead portion of the tire and extending in a diagonal direction converging with the cords of said first layer to a position at the tread of the tire, whereby torsional forces transmitted through said body exert less tension on the cords of both said layers at said inner face when the tire is driven in said direction of convergence than when it is driven in the opposite direction, the margins of said layers being overlapped at the tread of the tire.

8. A pneumatic tire having a flexible body of rubber-like material including spaced-apart bead portions, sidewall portions and a ground-engaging tread portion, said body comprising a layer of cords at its inner face at one side of the tire and having the cords thereof anchored in one bead portion of the tire and extending diagonally to a position at the tread of the tire, a second layer of cords at said inner face at the other side of the tire and having the cords thereof anchored in the other bead portion of the tire and extending in a diagonal direction converging with the cords of the first said layer to a position at the tread of the tire, whereby torsional forces transmitted through said body exert less tension on the cords of both said layers at said inner face when the tire is driven in said direction of convergence than when it is driven in the opposite direction, a third layer of cords immediately superimposed upon the first said layer and anchored in the bead portion and extending diagonally to a position at the tread of the tire, and a fourth layer of cords immediately superimposed upon the said second layer and anchored in the bead portion and extending diagonally to a position at the tread of the tire, the third and fourth layers of cords extending in converging relation in the direction opposite to said direction of convergence of the first and second layers.

9. A pneumatic tire having a flexible body of rubber-like material including spaced-apart bead portions, sidewall portions and a ground-engaging tread portion, said body comprising a layer of cords at its inner face at one side of the tire and having the cords thereof anchored in one bead portion of the tire and extending diagonally to a position at the tread of the tire, and a second layer of cords at said inner face at the other side of the tire and having the cords thereof anchored in the other bead portion of the tire and extending in a diagonal direction converging with the cords of the first said layer to a position at the tread of the tire, whereby torsional forces transmitted through said body exert less tension on the cords of both said layers at said inner face when the tire is driven in said direction of convergence than when it is driven in the opposite direction, the first and second layers overlapping one another at the tread of the tire, a third layer of cords immediately superimposed upon the first said layer and anchored in the bead portion and extending diagonally to a position at the tread of the tire, and a fourth layer of cords immediately superimposed upon the said second layer and anchored in the bead portion and extending diagonally to a position at the tread of the tire, the third and fourth layers of cords extending in converging relation in the direction opposite to the direction of convergence of the first and second layers and being in overlapping relation to one another and to the overlapping portions of the first and second layers at the tread of the tire.

VINCENT B. GAY.